US012132368B2

(12) United States Patent
Engelhardt et al.

(10) Patent No.: US 12,132,368 B2
(45) Date of Patent: Oct. 29, 2024

(54) STATOR OF AN ELECTRIC MACHINE, METHOD FOR PRODUCING SAME AND ELECTRIC MACHINE

(71) Applicant: Dr. Ing. h.c. F. Porsche Aktiengesellschaft, Stuttgart (DE)

(72) Inventors: Tobias Engelhardt, Stuttgart (DE); Stefan Oechslen, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 269 days.

(21) Appl. No.: 17/745,907

(22) Filed: May 17, 2022

(65) Prior Publication Data

US 2022/0385127 A1    Dec. 1, 2022

(30) Foreign Application Priority Data

May 25, 2021    (DE) ...................... 10 2021 113 440.4

(51) Int. Cl.
*H02K 3/24*    (2006.01)
*H02K 3/12*    (2006.01)
(Continued)

(52) U.S. Cl.
CPC ................. *H02K 3/24* (2013.01); *H02K 3/12* (2013.01); *H02K 3/28* (2013.01); *H02K 3/345* (2013.01); *H02K 15/12* (2013.01)

(58) Field of Classification Search
CPC .. H02K 3/12; H02K 3/24; H02K 3/28; H02K 3/34; H02K 3/345; H02K 15/12
(Continued)

(56) References Cited

U.S. PATENT DOCUMENTS

| 4,994,700 A | 2/1991 | Bansal et al. |
| 2002/0135245 A1* | 9/2002 | Derleth .................. H02K 9/227 310/64 |

(Continued)

FOREIGN PATENT DOCUMENTS

| CN | 211239470 U | 8/2020 |
| DE | 102016101705 A1 | 8/2017 |

(Continued)

OTHER PUBLICATIONS

English Machine Translation of CN211239470 (Year: 2020).*
English Machine Translation of JP2002186215 (Year: 2002).*
English Machine Translation of JP2002165411 (Year: 2002).*

*Primary Examiner* — Rashad H Johnson
(74) *Attorney, Agent, or Firm* — LEYDIG, VOIT & MAYER, LTD.

(57) ABSTRACT

A stator of an electric machine includes: a laminated stator core having sheet-metal blanks, which have slots; and stator windings, which are arranged in the slots of the laminated stator core together with slot insulation, such that, within the slots, a respective slot insulation is positioned between the sheet-metal blanks and the stator windings in order to electrically insulate the stator windings from a sheet-metal material of the sheet-metal blanks, and such that, when viewed in an axial direction, the stator windings protrude from the slots, project laterally with respect to the laminated stator core, and form winding overhangs laterally adjacent to the laminated stator core. When viewed in a radial direction, coolant flow channels are formed radially on an inside and/or radially on an outside, directly adjacent to the slots accommodating the stator windings. The stator windings accommodated in the slots of the laminated stator core are impregnated.

15 Claims, 4 Drawing Sheets

(51) Int. Cl.
  *H02K 3/28* (2006.01)
  *H02K 3/34* (2006.01)
  *H02K 15/12* (2006.01)
(58) Field of Classification Search
  USPC .......................................................... 310/268
  See application file for complete search history.

(56) References Cited

U.S. PATENT DOCUMENTS

| | | |
|---|---|---|
| 2011/0133580 A1 | 6/2011 | Sugimoto et al. |
| 2012/0080982 A1* | 4/2012 | Bradfield ................. H02K 9/00 310/60 A |
| 2012/0112570 A1* | 5/2012 | Le Besnerais ........... H02K 1/20 310/54 |
| 2013/0140924 A1 | 6/2013 | Glubrecht |
| 2014/0252893 A1 | 9/2014 | Veeh et al. |
| 2014/0292118 A1 | 10/2014 | Takahashi |
| 2017/0063200 A1 | 3/2017 | Tremelling et al. |
| 2018/0226855 A1 | 8/2018 | Berendes et al. |
| 2020/0136445 A1* | 4/2020 | Hoerz .................... H02K 9/227 |
| 2020/0153306 A1* | 5/2020 | Uhlmann ................. H02K 3/24 |
| 2020/0156296 A1* | 5/2020 | E Silva ................... H02K 3/48 |
| 2020/0161916 A1* | 5/2020 | E Silva ................... H02K 9/227 |
| 2020/0161917 A1* | 5/2020 | E Silva ................... H02K 3/24 |
| 2020/0185986 A1 | 6/2020 | Lewandowski et al. |
| 2020/0204024 A1* | 6/2020 | Hoerz .................... H02K 9/197 |
| 2020/0295614 A1 | 9/2020 | Cunningham et al. |
| 2020/0295615 A1* | 9/2020 | Cunningham ........... H02K 3/24 |
| 2020/0295617 A1* | 9/2020 | Cunningham ......... H02K 3/487 |
| 2020/0373800 A1* | 11/2020 | Stoll ........................ H02K 9/19 |
| 2020/0373803 A1* | 11/2020 | Stoll ........................ H02K 3/28 |
| 2021/0036568 A1* | 2/2021 | Schulz .................... H02K 3/12 |
| 2021/0203212 A1 | 7/2021 | Fuchs et al. |
| 2022/0014062 A1* | 1/2022 | Almeida E Silva ... H02K 9/227 |
| 2022/0021259 A1* | 1/2022 | Almeida E Silva ..... H02K 9/19 |
| 2022/0200382 A1 | 6/2022 | Liu et al. |
| 2022/0393538 A1* | 12/2022 | Engelhardt ............ H02K 9/197 |
| 2023/0396111 A1* | 12/2023 | Pennington, III ..... H02K 9/197 |
| 2024/0022130 A1* | 1/2024 | Lettich .................. H02K 9/197 |
| 2024/0055913 A1* | 2/2024 | Marsetz ................. H02K 3/24 |
| 2024/0055952 A1* | 2/2024 | Winkler ................. G06F 30/20 |
| 2024/0072590 A1* | 2/2024 | Mahmoudi ............. H02K 3/12 |

FOREIGN PATENT DOCUMENTS

| | | |
|---|---|---|
| DE | 102017102141 A1 | 8/2018 |
| DE | 102017214427 A1 | 2/2019 |
| DE | 102017221835 A1 | 6/2019 |
| DE | 102019113950 A1 | 11/2020 |
| JP | S5143304 U | 3/1976 |
| JP | S5149410 U | 4/1976 |
| JP | S5381804 U | 7/1978 |
| JP | S53095207 A | 8/1978 |
| JP | 2002165411 A | 6/2002 |
| JP | 2002186215 A | 6/2002 |
| JP | 2003164088 A | 6/2003 |
| JP | 2014197962 A | 10/2014 |
| JP | 2020099179 A | 6/2020 |
| JP | 2021505118 A | 2/2021 |
| WO | WO 2013075783 A2 | 5/2013 |
| WO | WO 2013/166372 A1 | 11/2013 |

* cited by examiner

STATOR OF AN ELECTRIC MACHINE, METHOD FOR PRODUCING SAME AND ELECTRIC MACHINE

CROSS-REFERENCE TO PRIOR APPLICATION

Priority is claimed to German Patent Application No. DE 10 2021 113 440.4, filed on May 25, 2021, the entire disclosure of which is hereby incorporated by reference herein.

FIELD

The invention relates to a stator of an electric machine, to an electric machine having a stator and to a method for producing the stator.

BACKGROUND

The fundamental construction of an electric machine is known from practical experience. Thus, an electric machine has a stator, which has a housing, a laminated stator core and stator windings with winding overhangs. Furthermore, an electric machine has a rotor, which has a rotor shaft and a laminated rotor core.

During the operation of an electric machine, power loss occurs in the components thereof. Power loss is released as heat. It is important here to dissipate the heat from the electric machine in order to be able to operate the electric machine at an optimum operating temperature. It is already known from practical experience that the stator of an electric machine can be cooled with the aid of a coolant flowing through a cooling circuit.

WO 2013/075 783 A2 discloses a stator of an electric machine having a laminated stator core which is composed of stator laminations. The laminated stator core has slots, which serve to accommodate stator windings. Through openings are introduced into the stator laminations of the laminated stator core, said openings being aligned in the laminated stator core and forming cooling channels. The cooling channels are arranged with a radial spacing and offset in the circumferential direction with respect to the slots which accommodate the stator windings.

DE 10 2017 214 427 A1 discloses a stator of an electric machine having a laminated stator core and stator windings. A cooling channel for cooling the laminated stator core extends through the laminated stator core at a distance from the stator windings.

DE 10 2016 101 705 A1 and DE 10 2019 113 950 A1 each disclose the cooling of winding overhangs of the stator windings of a stator of an electric machine. In this case, coolant flows around each of the winding overhangs.

DE 10 2017 102 141 A1 discloses another stator of an electric machine having a laminated stator core and stator windings. The stator windings are accommodated in slots of the laminated stator core and a coolant flows around them for the purpose of cooling. In this case, the coolant flows through the slots accommodating the windings. In order to prevent coolant from getting into the gap between the stator and the rotor of the electric machine, a sealing means, which is designed as a sleeve, is provided radially on the inside of the stator.

Although cooled stators of electric machines are already known from the prior art, there is a need for a novel stator of an electric machine with effective cooling and high mechanical stability.

SUMMARY

In an embodiment, the present invention provides a stator of an electric machine, comprising: a laminated stator core comprising sheet-metal blanks, which have slots; and stator windings, which are arranged in the slots of the laminated stator core together with slot insulation, such that, within the slots, a respective slot insulation is positioned between the sheet-metal blanks and the stator windings in order to electrically insulate the stator windings from a sheet-metal material of the sheet-metal blanks, and such that, when viewed in an axial direction, the stator windings protrude from the slots, project laterally with respect to the laminated stator core, and form winding overhangs laterally adjacent to the laminated stator core, wherein, when viewed in a radial direction, coolant flow channels are formed radially on an inside and/or radially on an outside, directly adjacent to the slots accommodating the stator windings, and wherein the stator windings accommodated in the slots of the laminated stator core are impregnated with an electrically insulating impregnating material such that, within the slots, free spaces between the slot insulation and the stator windings are filled with the electrically insulating impregnating material.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In an embodiment, the present invention provides a novel stator of an electric machine, an electric machine having such a stator and a method for producing such a stator.

In an embodiment, the present invention provides a stator of an electric machine as described herein.

When viewed in the radial direction, coolant flow channels are formed radially on the inside and/or radially on the outside, directly adjacent to the slots accommodating the stator windings. The stator windings accommodated in the slots of the laminated stator core are impregnated with an electrically insulating impregnating material in such a way that, within the slots, free spaces between the slot insulation and the stator windings are filled with the electrically insulating impregnating material.

In the stator according to the invention, the stator windings which are accommodated in the slots of the laminated stator core are impregnated with the electrically insulating impregnating material, to be precise in such a way that, within the slots, free spaces between the slot insulation and the stator windings are preferably completely filled with the electrically insulating impregnating material. Thus, no coolant flows through the slots as such. On the contrary, the coolant flows through the coolant flow channels, which are formed radially on the inside and/or radially on the outside, directly adjacent to the slots accommodating the stator windings. Effective cooling of the stator in combination with high mechanical stability thereof can thereby be ensured.

There is preferably no sheet-metal material of the sheet-metal blanks arranged between the coolant flow channels and the slots. Recesses of the sheet-metal blanks, within which the coolant flow channels run, merge into the slots of the sheet-metal blanks. This permits particularly effective dissipation of heat from the stator windings and thus from the stator of an electric machine.

Seals are preferably arranged in the recesses within which the coolant flow channels run, said seals sealing the coolant flow channels with respect to the sheet-metal blanks. This permits particularly advantageous production of the stator of the electric machine.

The electric machine is described herein and the method for producing the stator is described herein.

Figure 1:
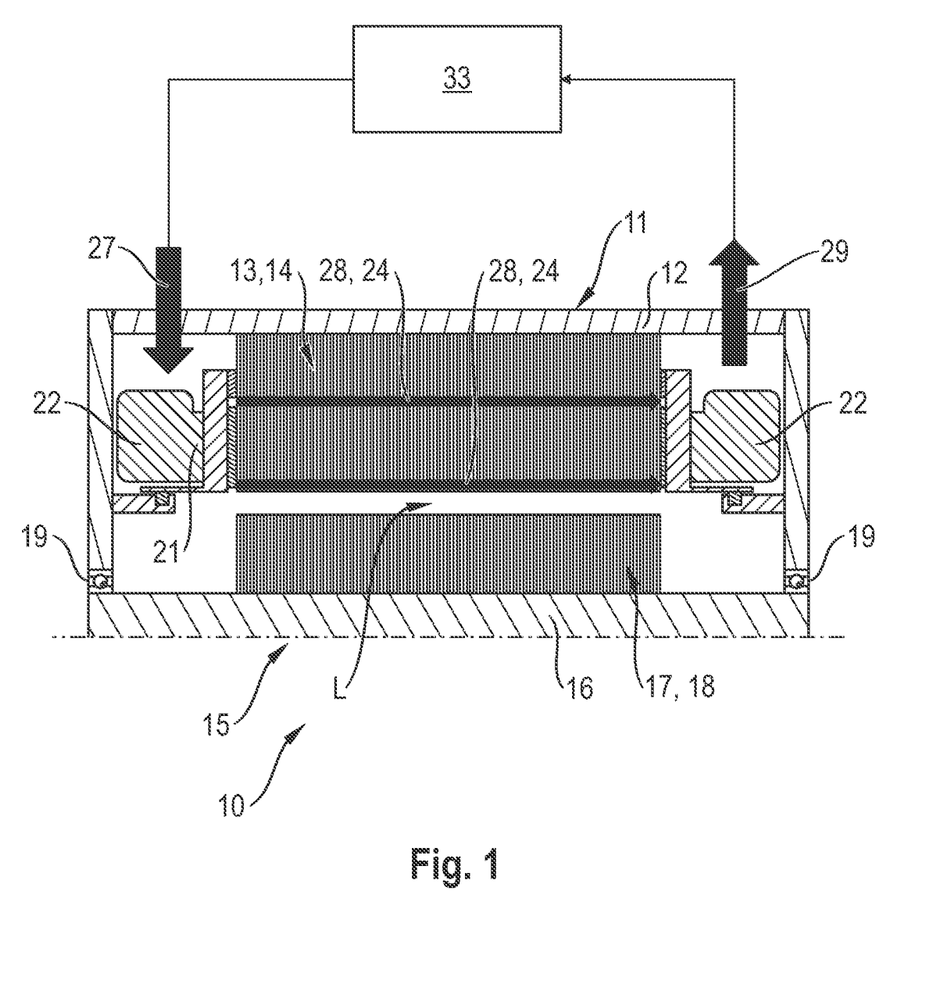
FIG. 1 shows a schematic axial section through an electric machine in the region of a stator and a rotor.

FIG. 1 shows a schematic axial section through an electric machine 10. The electric machine 10 has a stator 11 having a housing 12 and a laminated stator core 13, which is composed of a plurality of sheet-metal blanks 14. Furthermore, the electric machine 10 comprises a rotor 15 having a rotor shaft 16 and a laminated rotor core 17, which is likewise composed of a plurality of sheet-metal blanks 18. The rotor 15, namely the shaft 16, is rotatably mounted in the housing 12 of the stator 11 by means of bearings 19. An air gap L is formed between the stator 11 and the rotor 15, namely between the laminated stator core 13 and the laminated rotor core 17.

As already explained, the stator 11 has the laminated stator core 13, which is composed of the sheet-metal blanks 14. The sheet-metal blanks 14, and thus the laminated stator core 13, have a plurality of slots 20, which serve to accommodate stator windings 21. The stator windings 21 extend in the axial direction of the laminated stator core 13 within the slots 20 thereof, wherein the stator windings 21 protrude from the slots 20 when viewed in the axial direction, project laterally with respect to the laminated stator core 13 and form winding overhangs 22 laterally adjacent to the laminated stator core 13.

The slots 20 accommodate not only the stator windings 21 but also slot insulation 23. The slot insulation 23 is positioned between the sheet-metal material of the sheet-metal blanks 14 of the laminated stator core 13 and the stator windings 21 in order to electrically insulate the stator windings 21 from the laminated stator core 13.

In the case of the stator 11 according to the invention, when viewed in the radial direction, coolant flow channels 24 are formed radially on the inside and/or radially on the outside, directly adjacent to the slots 20 accommodating the stator windings 21.

The stator windings 21 arranged in the slots 20 are impregnated with an electrically insulating impregnating material 25, more specifically in such a way that, within the slots 20, free spaces 26 between the slot insulation 23 and the stator windings 21 and, within the slots, free spaces 26 between the stator windings 21 are filled, in particular completely, with electrically insulating impregnating material 25.

The electrically insulating impregnating material 25, which in particular completely fills the free spaces 26 between the stator windings 21 and the slot insulation 23 and between the stator windings 21 in the region of the respective slot 20, ensures a high mechanical stability of the stator 11 in the region of the slots 20 accommodating the stator windings 21. Heat can be effectively dissipated from the stator windings 21, and thus from the stator 11, via the coolant flow channels 24, which, radially on the inside and/or radially on the outside, are directly adjacent to the slots 20.

The coolant flow channels 24 are formed directly adjacent to the slots 20 accommodating the stator windings 21. There is no sheet-metal material of the sheet-metal blanks 14, and thus of the laminated stator core 13, radially between the coolant flow channels 24 and the slots 20. Recesses 30 of the sheet-metal blanks 14, within which the coolant flow channels 24 run, merge into the slots 20 of the sheet-metal blanks 14. In the respective sheet-metal blank 14 as such, which has not yet been installed to form the stator 11, the recesses 30 within which the coolant flow channels 24 of the finished stator 11 run form, radially on the inside and/or radially on the outside, extensions of the slots 20, which, when viewed in the circumferential direction, have a smaller circumferential width than the slots 20.

The recesses 30 and the coolant flow channels 24 are preferably arranged in the middle of the slots 20 in the circumferential direction.

When there are coolant flow channels 24 directly adjacent to the slots 20, both radially on the inside and radially on the outside, the radially inner coolant flow channels 24 preferably have a smaller circumferential width in the circumferential direction than the radially outer coolant flow channels 24.

Figure 2:
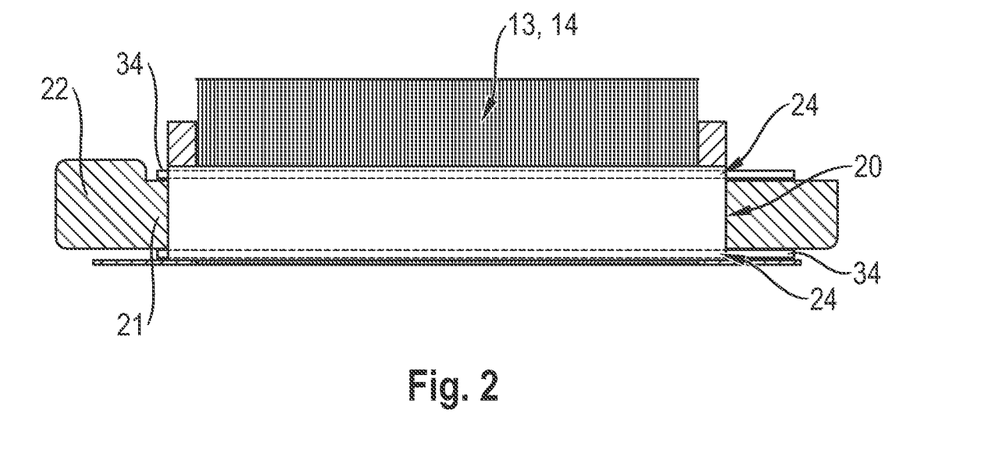
FIG. 2 shows a detail of the stator of FIG. 1 during the production of the stator.
Figure 3:
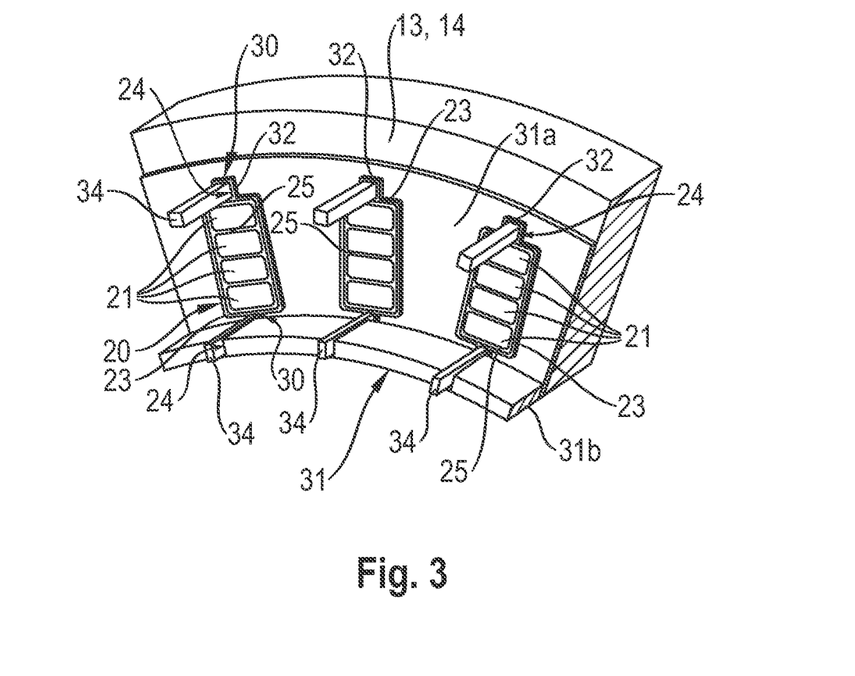
FIG. 3 shows a detail of FIG. 2 in a perspective view.

In the electric machine 10 of FIG. 1, of which details are shown in FIGS. 2 and 3 as well as 6, a coolant inflow 27 takes place on a first axial side of the housing 12 of the stator 11 in the direction of the winding overhang 22 formed on this axial side and flows directly around this winding overhang 22, wherein the coolant then flows in the axial direction through the laminated stator core 13, through the coolant flow channels 24 of the laminated stator core 13, in accordance with the arrows 28, and emerges from the laminated stator core 13 on the opposite, second axial side in order to flow directly around and thus to cool the winding overhang 22 formed on this axial side and to be discharged from the housing 12 of the stator 11 via a coolant outlet 29. Starting from the coolant outlet 29, the coolant can be fed to a heat exchanger 33 in order to remove heat from the coolant and, after the removal of heat, to feed the coolant again to the coolant inflow 27 in the sense of a closed cooling circuit using a pump.

In FIG. 1, end plates 31 having an axial section 31a and a radial section 31b are positioned at both axial ends of the laminated stator core 13.

These end plates 31, namely the axial sections 31a thereof, ensure that the coolant can enter the coolant flow channels 24 without leakage on the first axial side of the laminated stator core 13 and can emerge from the coolant flow channels 24 without leakage on the opposite, second axial side.

Furthermore, the end plates 31, namely the radial sections 31b thereof, prevent coolant which cools the winding overhangs 22 from reaching the region of the rotor 15, starting from the winding overhangs 22. As already stated, the slots 20 of the laminated stator core 13 accommodate not only the stator windings 21 but also the slot insulation 23.

Figure 6:
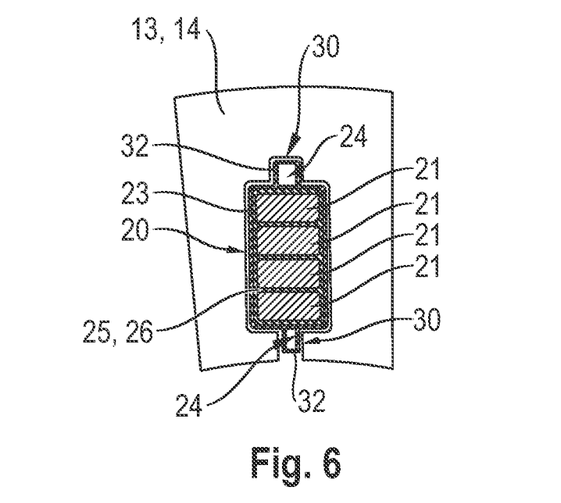
FIG. 6 shows a detail of FIGS. 3 and 5.

In the exemplary embodiment of FIGS. 1, 2, 3 and 6, seals 32 are positioned in the recesses 30 within which the coolant flow channels 24 run. The seals 32 seal the coolant flow channels 24 with respect to the sheet-metal blanks 14. In FIG. 6, the seals 32 delimit the coolant flow channels 24 on all sides at the periphery of the coolant flow channels 24. The seals 32 prevent coolant which flows via the coolant flow channels 24 from flowing radially inward in the direction of the rotor 15, namely in the direction of the air gap L formed between the rotor 15 and the stator 11, and thus from reaching the region of the rotor 15.

In the exemplary embodiment of FIGS. 1, 2, 3 and 6, the seals 32 separate the coolant flow channels 24 from the slots 20. When viewed in the cross section of FIG. 6, the slot insulation 23 and the seals 32 accordingly delimit in each case separate accommodation spaces, namely the slot insulation 23 delimits an accommodation space for accommodating the stator windings 21 and the impregnating material 25, and the seals 32 delimit accommodation spaces the coolant flow channels 24. In this case, according to FIG. 6, the seals 32 are formed by sections of the slot insulation 23.

Figure 7:
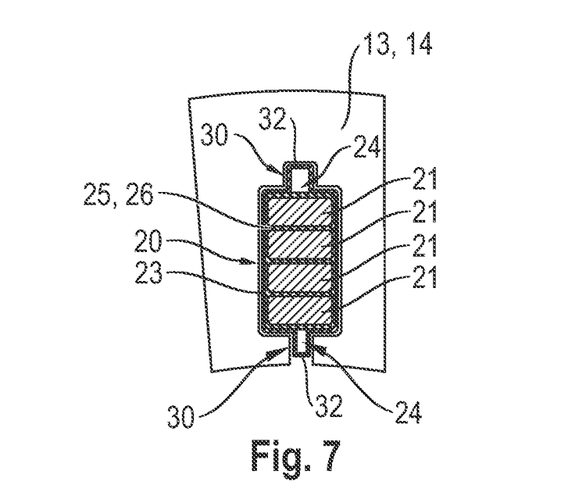
FIG. 7 shows an alternative detail to the detail of FIG. 6.

In contrast to FIG. 6, FIG. 7 shows an embodiment of the invention in which, as in FIG. 6, the seals 32 are formed by sections of the slot insulation, but the seals 32 do not separate the coolant flow channels 24 from the slots 20. In FIG. 7, this is accomplished by means of the impregnating material 25 introduced into the free spaces 26 between the slot insulation 23 and the stator windings 21.

In the exemplary embodiments of FIGS. 1 to 3, 6 and 7, therefore, the coolant-side sealing of the rotor 15 from the stator 11 is accomplished, on the one hand, by means of the end plates 31 and, on the other hand, by means of the seals 32, in order in this way to prevent coolant getting from the stator 11 to the region of the rotor 15. Coolant which enters the housing 12 of the stator 11 via the coolant inflow 27 first cools the winding overhang 22 positioned on this first axial side by direct flow around it and then enters the coolant channels 24 via the axial section 31a of the respective end plate 31, which channels are delimited at least in some sections by the seals 32. On the opposite second axial side of the laminated stator core 13, the coolant emerges from the coolant flow channels 24 via the axial section 31a of the respective end plate 31 and cools the winding overhang 22 positioned there, likewise by direct flow around it, in order then to be discharged from the housing 12 of the stator 11 via the coolant outlet 29.

The end plates 31 prevent coolant which cools the winding overhangs 22 from reaching the region of the rotor 15, whereas the seals 32 prevent coolant which flows via the coolant channels 24 to cool the stator windings 21 positioned in the slots 20 from reaching the region of the rotor 15, starting from the coolant flow channels 24.

To produce the stator 11, shown in FIGS. 1 to 3, 6 and 7, of the electric machine 10, shown there, the procedure is such that first of all a laminated stator core 13 is prepared from stacked sheet-metal blanks 14, the sheet-metal blanks 14 and thus the laminated stator core 13 having, on the one hand, the slots 20 and, on the other hand, the recesses 30, which merge directly into the slots 20.

Furthermore, slot insulation 23 is provided and the slot insulation 23 is arranged in the slots 20. In FIGS. 6 and 7, sections of the slot insulation 23 form the seals 32 which are arranged in the recesses 30.

The stator windings 21 are arranged in the slots 20. Placeholders 34 are arranged in the recesses 30.

Figure 8:
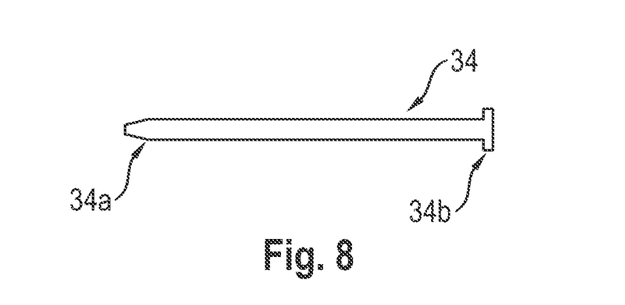
FIG. 8 shows a side view of a placeholder used in the production of the stator.

FIG. 8 shows such a placeholder 34. FIGS. 2 and 3 and FIGS. 4 and 5 also show placeholders 34 which are arranged in the recesses 30 during the production or manufacture of the stator 11, namely within the seals 32 positioned in the recesses 30.

It is possible to arrange the placeholders 34 first in the recesses 23 or in the seals 32 and then to arrange the stator windings 21 in the slots 20 or the slot insulations 23. It is likewise possible to arrange the stator windings 21 in the slots 20 and then to arrange the placeholders 34 in the recesses 30.

After the stator windings 21 have been arranged in the slots 20 and the placeholders 34 have been arranged in the recesses 30, the stator windings 21 are impregnated with the electrically insulating impregnating material 25, during which process, within the slots 20, the free spaces 26 between the slot insulation 23 and the stator windings 21 and also free spaces 26 between adjacent stator windings 21 are preferably completely filled with the electrically insulating impregnating material 25. No impregnating material 25 gets into those regions in which the placeholders 34 are arranged, and therefore, after the placeholders 34 have been removed from the recesses 30, the placeholders 34 free the coolant flow channels 24 in the region of the recesses 30, which are delimited by the seals 32 on all sides in FIG. 6 and partially in FIG. 7 when viewed in the circumferential direction of the coolant flow channels 24.

During the production of the stator 11 of FIGS. 1 to 3, 6 and 7, the end plates 31 are arranged, in particular molded on, at the axial ends of the laminated stator core 13 after the slot insulation 23 has been arranged in the slots 20 and before the stator windings 21 have been arranged in the slots 20 and before the placeholders 34 have been arranged in the recesses 30.

The impregnating material used can be epoxy resin, for example. Impregnation can be accomplished by means of trickle impregnation or immersion impregnation or a vacuum method.

During the production of the stator 11, it is envisaged that the placeholders 34 and the stator windings 21 are pushed into the recesses 30 and into the slots 20 from the same side of the laminated stator core 13 in the axial direction. To make it easier to insert the placeholders 34 into the recesses 30, they have a tip 34a which tapers conically. This enables the placeholder 34 to be introduced into the recesses 30 in a particularly advantageous manner. In order to simplify the handling of the placeholder 34, it has a grip 34b at an end opposite the tip 34a. The placeholder 34 is widened at the grip 34b, wherein the grip 34b also defines a stop which limits the depth of insertion of the respective placeholder 34 into the respective recess 30.

On that axial side from which the placeholders 34 are pushed into the recesses 30, the stator windings 21 are designed in such a way that the stator windings 21 or the winding overhangs 22 of the latter on the one hand allow unhindered introduction of the placeholders 34 into the recesses 30 and on the other hand allow unhindered removal thereof from the recesses 30.

Figure 4:
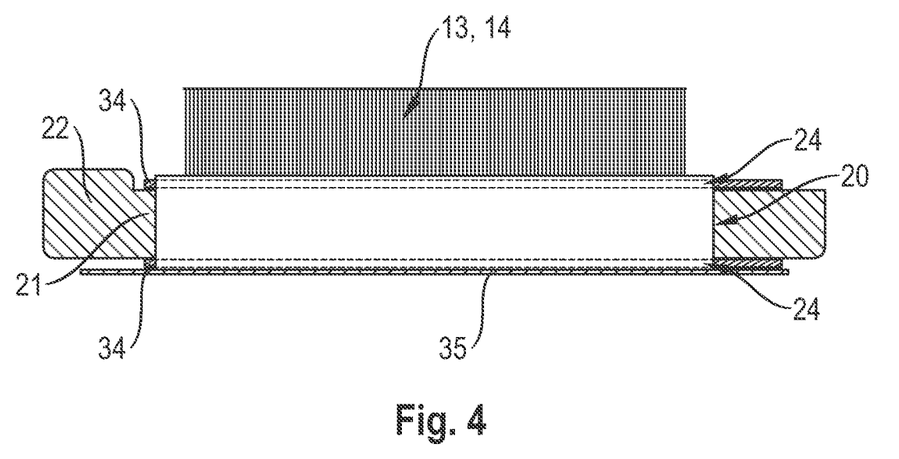
FIG. 4 shows an alternative detail of a stator to the detail of FIG. 2.
Figure 5:
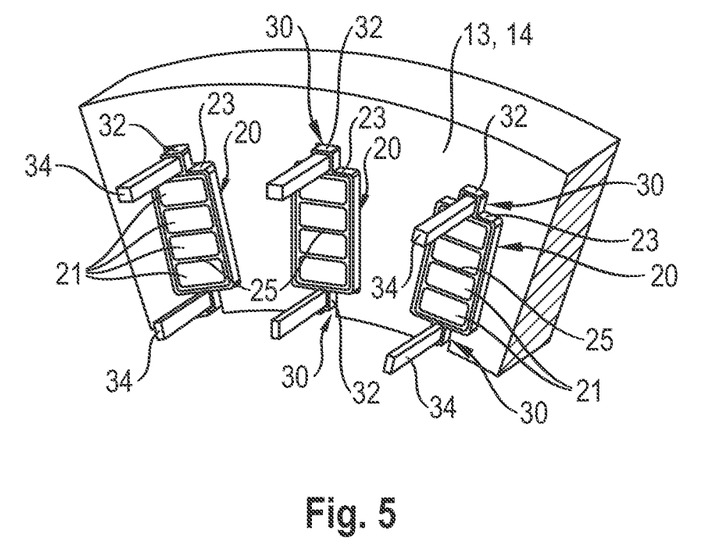
FIG. 5 shows a detail of FIG. 4 in a perspective view.

In the exemplary embodiment of FIGS. 1 to 3, 6 and 7, the end plates 31 are present in the region of the axial ends of the laminated stator core 13 in order to prevent a flow of the coolant starting from the stator 11 in the direction of the rotor 15. FIGS. 4 and 5 show a modification of the stator according to the invention, in which a sleeve 35, which prevents the coolant from getting into the region of the rotor 15, adjoins the laminated stator core 13 radially on the inside. As a result of this sleeve 35, it would then be possible to dispense with the seals 32 in the recesses 30. In FIGS. 4 and 5, however, the seals 32 are also used in the recesses 30, despite the sleeve 35.

With regard to all other details, the exemplary embodiment of FIGS. 4 and 5 corresponds to the exemplary embodiment of FIGS. 1 to 3, 6 and 7, and therefore the same reference numbers are used for identical subassemblies in order to avoid unnecessary repetitions, and reference can be made to the statements relating to the exemplary embodiment of FIGS. 1 to 3, 6 and 7.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A stator of an electric machine, the stator comprising:
   a laminated stator core comprising sheet-metal blanks, which have slots; and
   stator windings, which are arranged in the slots of the laminated stator core together with slot insulation, such that, within the slots, a respective slot insulation is positioned between the sheet-metal blanks and the stator windings in order to electrically insulate the stator windings from a sheet-metal material of the sheet-metal blanks, and such that, when viewed in an axial direction, the stator windings protrude from the slots, project laterally with respect to the laminated stator core, and form winding overhangs laterally adjacent to the laminated stator core,
   wherein, when viewed in a radial direction, coolant flow channels are formed radially on an inside and/or radially on an outside, directly adjacent to the slots accommodating the stator windings,
   wherein, when viewed in the radial direction, the sheet-metal blanks each comprise recesses configured to accommodate the coolant flow channels, the recesses being arranged directly adjacent the slots and extending radially inward from the slots, each recess having a smaller circumferential width than each slot when viewed in a circumferential direction, and
   wherein the stator windings accommodated in the slots of the laminated stator core are impregnated with an electrically insulating impregnating material such that, within the slots, free spaces between the slot insulation and the stator windings are filled with the electrically insulating impregnating material.

2. The stator of claim 1, wherein no sheet-metal material of the sheet-metal blanks is arranged between the coolant flow channels and the slots.

3. The stator of claim 1, wherein the recesses of the sheet-metal blanks, within which the coolant flow channels run, merge into the slots of the sheet-metal blanks within which the stator windings are arranged.

4. The stator of claim 3, further comprising:
   seals arranged in the recesses within which the coolant flow channels run, the seals being configured to seal the coolant flow channels with respect to the sheet-metal blanks.

5. The stator of claim 4, wherein only the seals separate the coolant flow channels from the slots.

6. The stator of claim 4, wherein the seals are formed by sections of the slot insulation.

7. The stator of claim 4, wherein the slot insulation completely delimits an accommodation space for accommodating the stator windings and the impregnating material, and wherein the seals delimit accommodation spaces for the coolant flow channels.

8. The stator of claim 1, further comprising:
   a sleeve, which seals the laminated stator core radially on the inside, the sleeve adjoining the laminated stator core radially on the inside when viewed in the radial direction.

9. The stator of claim 1, further comprising:
   end plates that adjoin the laminated stator core when viewed in the axial direction, the end plates sealing the coolant flow channels on axial sides of the laminated stator core.

10. An electric machine, comprising:
    a rotor; and
    the stator of claim 1,
    wherein the stator surrounds the rotor radially on an outside, forming an air gap between the rotor and the stator.

11. A method for producing the stator of claim 1, the method comprising: providing the laminated stator core comprising the sheet-metal blanks, which have the slots and recesses; providing slot insulation and arranging the slot insulation in the slots; arranging the stator windings in the slots; arranging placeholders in the recesses; providing the electrically insulating impregnating material and impregnating the stator windings with the electrically insulating impregnating material, during which process, within the slots, free spaces between the slot insulation and the stator windings are filled with the electrically insulating impregnating material; and removing the placeholders from the recesses so as to free the coolant flow channels.

12. The method of claim 11, wherein the placeholders are first arranged in the recesses and then the stator windings are arranged in the slots.

13. The method of claim 11, wherein the stator windings are first arranged in the slots and then the placeholders are arranged in the recesses.

14. The method of claim 11, wherein the placeholders and the stator windings are pushed into the recesses and into the slots from a same side of the laminated stator core in the axial direction.

15. The stator of claim 1, wherein, when viewed in the radial direction, the sheet-metal blanks further comprise recesses arranged directly adjacent the slots and extending radially outward from the slots, such that a recess is arranged on both a radially inner and radially outer end of each slot of each sheet-metal blank.

\* \* \* \* \*